Nov. 27, 1956  J. M. SELLERS  2,772,061
APPARATUS FOR DISSEMINATING INSECTICIDES
Filed Sept. 8, 1952
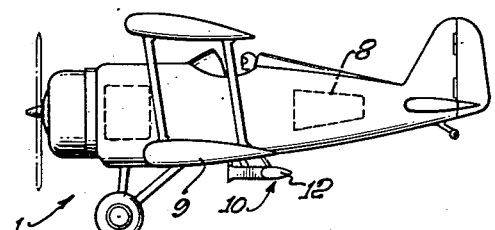
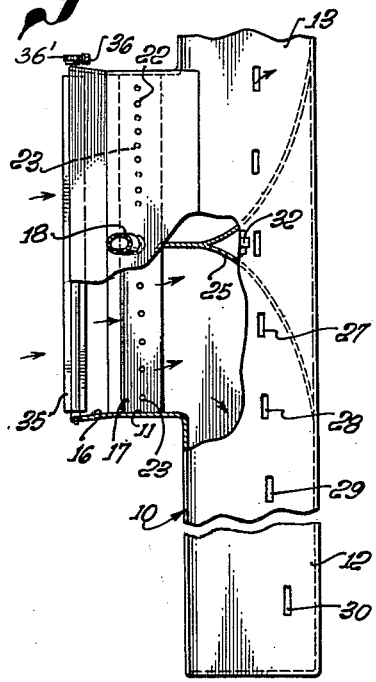
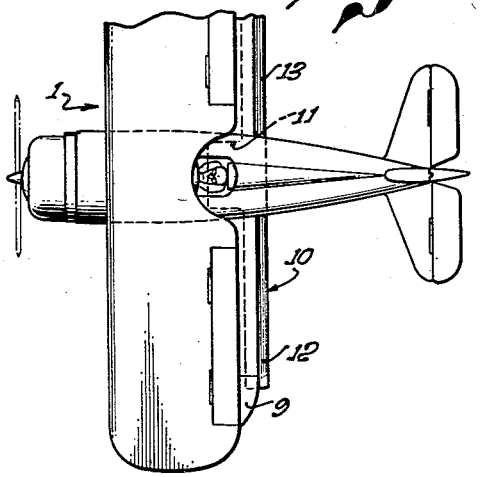
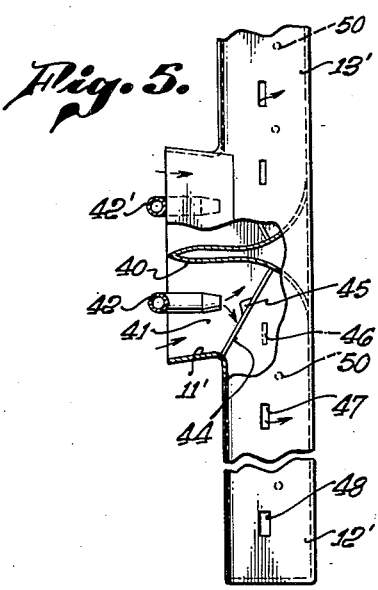
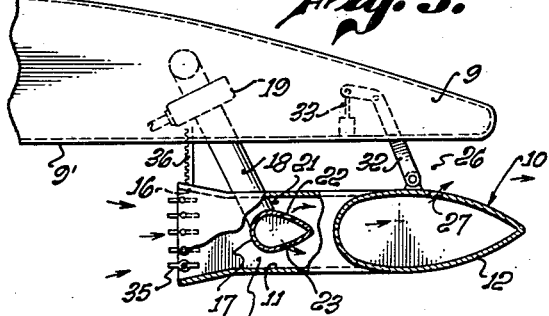
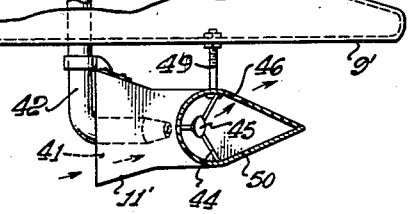
INVENTOR.
JOSEPH M. SELLERS,
BY
ATTORNEY.

United States Patent Office 2,772,061
Patented Nov. 27, 1956

2,772,061

APPARATUS FOR DISSEMINATING INSECTICIDES

Joseph M. Sellers, Bakersfield, Calif.

Application September 8, 1952, Serial No. 308,350

5 Claims. (Cl. 244—136)

This invention pertains to methods of applying a liquid treating agent to crops and the like from a low-flying airplane, in an efficient and economical, controllable manner. The invention also pertains to devices and arrangements of elements, adapted for use on an airplane, for forming fogs or mists containing a treating liquid, without the necessity of using pumps, distributing brushes or other driven equipment.

Generally stated this invention relates to the art of distributing insecticides, defoliating agents, growth stimulating materials, weed killers, hormone-like preparations, fungicides and other treating agents in the form of solutions or suspensions, such solutions, suspensions or emulsions being supplied to the vegetation or crops being treated in the form of an aerosol, fog, or mist. The treating agents are ordinarily dissolved or suspended in an aqueous medium and then spread, atomized or misted into the atmosphere through the plurality of nozzles. When such treating agents are applied to crops from an airplane such airplane has heretofore carried not only a supply of the treating solution but in addition had to be equipped with pumps, nozzles, distributing brushes and various other pieces of equipment which increased the total weight being carried, were difficult to operate and could not be readily regulated so as to vary the concentration or the rate of application without adjustments prior to flight. Moreover, nozzles were often clogged or became inactive during flight and undesirable distribution was attained. Another objection to previous methods of distributing such liquid treating agents was the fact that the pilot could not rapidly initiate and terminate the spraying or fogging operation. It is very important that the equipment be instantaneously responsive so that the distribution of the treating agent can be quickly terminated. The importance of this can be readily appreciated when one considers that a defoliating agent may be sprayed from an airplane upon a field of cotton whereas the adjoining land may be covered by a crop which would be very deleteriously affected by a defoliating agent. The crop dusting or spraying airplane must be able to controllably and instantaneously shut off the spraying mechanism in order to prevent application of the defoliating agent to the crop on the adjacent land even though the airplane itself needs fly over the adjacent lands. In accordance with the present invention pumps and other motor driven devices for subjecting the treating solution to pressure and nozzles are completely eliminated. The present invention utilizes the flow of air past the airplane for the purpose of sucking treating solution from the tank to a mixing chamber, utilizes the pressure differential set up in a venturi-like mixing chamber for the purpose of producing a quantity of air containing the liquid in the form of fine suspended droplets and also utilizes the flow of air past the airplane for the purpose of creating a uniform fog or mist which is then discharged from a distribution header. In other words, the present invention employs at a totally novel mode of operation and moreover utilizes a simple light weight arrangement of elements which is substantially foolproof, self-cleaning and readily adjustable.

An object of the present invention therefore is to disclose and provide a novel method of applying liquid treating agents to crops and the like from a low-flying airplane.

Another object of the present invention is to disclose and provide a device adapted for use on an airplane for forming fogs and mists containing a desired treating agent.

A further object is to disclose and provide a simple and efficient arrangement of elements whereby treating agents can be readily disseminated in a uniform and controllable manner.

These and various other objects, advantages and adaptations of the present invention will become apparent to those skilled in the art from the following detailed description of certain exemplary forms of arrangements capable of being used in the practice of the invention. For purposes of illustration reference will be had to the appended drawings in which:

Fig. 1 is a side elevation of a biplane of the type employed at present, such airplane being provided with the device of the present invention.

Fig. 2 is a plan view partly broken away indicating the general relationship and location of the devices on an airplane.

Fig. 3 is an enlarged side elevation partly in section of the trailing edge portion of an airfoil or wing of the airplane provided with the present invention.

Fig. 4 is a plan view of the form of device illustrated in Fig. 3, portions being broken away to facilitate understanding.

Fig. 5 is a plan view of a modified form of device.

Fig. 6 is a side elevation, partly in section of the device illustrated in Fig. 5 showing the relationship between such device and an airfoil.

Generally stated, a device of the present invention includes a mixing chamber and a distributing header associated therewith, the mixing chamber having an open air inlet end facing in the direction of flight of an airplane, the opposite end of the mixing chamber leading into the distributing header which extends in a direction virtually transverse to the direction of flight of the airplane. The mixing chamber is provided with a restricted throat and the liquid to be disseminated is supplied to the stream of air flowing past such throat. The entire device and particularly the distributing header thereof is located in spaced relation with one surface of an airfoil. The distributing header is provided with a plurality of spaced outlet ports and the flow of air through the throat formed between the distributing header and the airfoil is caused to suck the mixture of air and treating liquid out of the distributing header through the outlet ports so as to form a mist or fog beyond the trailing edge of the airfoil. A turbulence which might exist beyond such trailing edge is utilized in thoroughly mixing and disseminating the liquid with the tremendously large volume of air through which the airplane is traveling.

As indicated in Figs. 1 and 2, the biplane generally indicated at 1 may have the device of the present invention generally indicated at 10 positioned beneath the lower wing or airfoil 9 and in spaced relation to the lower surface of such wing. In the form illustrated a mixing chamber is indicated at 11 and distributing headers associated therewith are shown at 12 and 13. The airplane carries a tank or tanks such as 8 in which a supply of treating agent is contained, these tanks being connected by suitable piping of relatively large diameter with the mixing chamber.

By now referring to Figs. 3 and 4, it will be noted that the mixing chamber 11 may be of substantially rectangular cross-section and provided with an outwardly flaring inlet portion 16. The forward end of this chamber 11 is open and faces in the direction of flight of the airplane. The entire device is spaced from the lower surface 9' of the airfoil 9 and is preferably located in the rear half of the chord of such airfoil.

Extending transversely through the mixing chamber 11 is a liquid supply means shown in this instance in the form of a hollow member 17 having a streamlined cross-section (although a circular section can be used). The member 17 is connected at its midpoint to a supply pipe 18 leading to a source of treating liquid such as the tank 8. Such supply piping preferably includes a quick-acting control valve 19 so that the supply of liquid from the tank 8 to the liquid supply means 17 may be rapidly opened or closed. Quick-acting valves of a type capable of assuming intermediate positions so as to meter the amount of liquid flowing through are preferred.

It will be noted that the liquid supplying means 17 form a throat or pair of throats 20 and 21 within the mixing chamber. The means 17 is provided with a plurality of small perforations or ports such as 22 or 23 in communication with the throats 20 and 21 and preferably towards the rear of the narrowest portion of such throats. It will be evident that when the airplane provided with this device is in actual flight large volumes of air will pass through the mixing chamber and the velocity of such air will be increased at the throats 20 and 21 producing a suction effect tending to suck any liquid contained within the means 17 out into such high velocity stream of air flowing through the mixing chamber so as to form a homogeneous mixture of finely divided liquid and a large volume of air.

The rear portion of the mixing chamber is in commmunication with the two distributing headers 12 and 13. These headers preferably extend in direction substantially at right angles to the direction of the flight of the airplane although they may be slightly inclined rearwardly towards the outer and rear edges of the wings. The distributing headers illustrated may be in the form of flattened tubes to impart an airfoil section thereto, the ends of these hollow distributors being closed. Suitable baffle means such as are indicated at 25 are provided for the purpose of directing and conveying the mixture of air and liquid formed in the mixing chamber to the elongated distributing headers.

These distributing headers are spaced from the lower surface 9' of the airfoil and it will be evident that each header forms a throat such as 26 between such airfoil surface and the header, again producing a region of high velocity and reducing pressure. Each header such as the header 12 is provided with a plurality of spaced outlet ports such as 27, 28, 29, 30 and the like. These outlet ports are again preferably located so as to discharge into the throats 26 or slightly therebeyond the narrowest portion of such throat and thereby permit the flowing stream of air through such throat 26 to suck out of the distributing header 12 the mixture of air and treating liquid which has been supplied thereto from the mixing chamber 11.

Means are provided for adjustably positioning the device with respect to the surface of the airfoil. For example, the device may be suspended from a plurality of laterally spaced bell crank levers 32 pivotally connected to ribs of the wing and having one leg extending from the wing structure, said bell crank levers being operable by means of a cable 33 or by hydraulically operated means for moving the entire distributing header into a number of positions whereby the width of the throat 26 may be varied somewhat. The bell crank levers 32 can raise and lower the entire header 10 and its associated parts, the conduit 18 acting as a pivoting lever and support for the central section or intake portion of the device. Moreover, the device may be provided with louvers 35 at the open inlet to the mixing chamber for the purpose of adjustably opening or closing such inlet. The louvers may be mounted upon shafts each provided with a pinion 36', the pinions being in engagement with a rack gear 36 extending into the fuselage of the airplane and capable of being actuated by the pilot.

It may be noted at this time that in the form of device illustrated the mixing chamber is directly in line with the wash from the propeller of the aircraft and therefore a much larger volume of air passes into the mixing chamber and around the immediately adjacent portions of the distributing headers 12 and 13 than the volume of air which passes the outer, wing tip portions of such distributing headers. These headers extend laterally with respect to the air intake and constitute distributing zones for the material to be disseminated. Since it is desired that the fog or mist disseminated by the airplane be of substantially uniform concentration, the size, spacing or position of the various outlet ports 27—30 can be varied in order to control the output capacity of the headers per foot or in each section. Larger quantities of liquid should be discharged through those regions of the distribution header exposed to the propeller wash. For this reason, as indicated in Fig. 4, the outlet ports 27 and 28 in the region of the propeller wash are shown to be positioned near the narrowest portion of the throat 26 so that the effect of the high velocity and reduced pressure in such zone is most effectively utilized. The ports such as 29 and 30 are indicated to be towards the trailing edge of the distribution header 12 and somewhat removed from the narrowest portion of the throat 26. All of the various ports 27—30 may be arranged along an inclined or curve path. If desired, all of the ports could be located in a straight line facing the narrowest portion of the throat but the size of such ports could be varied, larger outlet ports being provided in the region being subjected to propeller wash than in the outer ends of each distributor.

It may be noted, however, that the total area of all of the outlet ports in the distribution headers 12 and 13 should total an area which is no less than the minimum cross-sectional area of the mixing chamber 11, in order to prevent the building up of an excessive pressure in the distribution headers and in order to most effectively utilize the venturi effect hereinbefore described. It may also be noted that the various outlet ports may be circular, polygonal or of any other desired form. It may be of interest to note that in actual practice, the distribution header 12 need not be streamlined as shown, but may be of circular cross-section and may vary in diameter from about four inches to six inches. The throat 26 may similarly vary from two inches to six inches or even eight inches. By making the various parts from light weight metals such as aluminum and by employing distribution headers of airfoil cross-section the lift-drag ratio of the wings is not materially altered. It is further to be noted that by placing the entire device in proximity to the upper camber or surface of the wings, a stabilized effect is obtained, although the sensitivity of the ailerons is modified.

It will be noted that in the form illustrated in Figs. 1 to 4 a single mixing chamber, located beneath the fuselage, supplies the mixture of air and liquid treating agent to two distributing headers which are substantially as long as the entire wing span of the airplane. It is to be understood that each wing may be provided with a smaller version of the same device, the airplane then being provided with two mixing chambers and associated headers, each under one of the wings.

A modified form of device is illustrated in Figs. 5 and 6. As there shown the mixing chamber 11' is again provided with an outwardly flaring opening and with a central vertically extending partition 40 dividing the mixing chamber housing into two separate inlet ports, each having a restricted throat section as at 41, each of such inlet ports then leading to a distributing header such as 12' and 13'. Means are provided for regulatably introducing liquid flowing through the throat 41 and such means may simply comprise a pipe 42 having an open end approximately at such throat 41 or slightly therebeyond. Beyond such throat and in the conduit communicating the mixing chamber with the distributing header 12' there may be positioned a spider 44 carrying an impact cone 45 adapted to receive and break up the liquid impinging thereupon from the supply pipe 42. The resulting mist of treating liquid then passes into the distribution header 12' and is discharged therefrom through the various ports 46, 47, 48 and the like. As it is assumed that this device is to be located beneath a single wing on one side of the fuselage the various outlet ports 46 and 48 may increase in size from a position adjacent the mixing chamber toward the end of the distributing header 12' as indicated in Fig. 5, in order to make certain that a uniform concentration is attained in the vapor trail left by the aircraft.

The two supply pipes 42 and 42' may lead to a common Y-connection and a common control valve not shown. The entire device is again affixed in proximity to a surface of an airfoil such as 9' in any suitable manner as for example, a plurality of spaced means 49.

In some instances it is desirable to include additional outlet ports in the lower surface of the distribution header and such lower outlet ports are indicated at 50 in Fig. 5.

Admittedly many changes and modifications may be made in the form and construction of the devices contemplated by this invention. The size of the devices, the size of the ports and the most desirable location of such outlet ports will depend on numerous factors such as, for example, the normal cruising speed of the aircraft upon which the device is carried, the spacing between the distribution header and the surface of the airfoil with which it cooperates, etc. Those skilled in the art have had these various factors called to their attention hereinabove together with a general rule to be followed. The application of such rules to a specific condition, in accordance with the teachings of this invention, need not be described in greater detail. All changes and modifications coming within the scope of the appended claims are embraced thereby.

I claim:

1. Apparatus for forming dispersions of fine particles of treating agent in a large volume of air comprising, an airplane provided with a forward propeller and an airfoil disposed rearwardly of such propeller; a mixing chamber having side walls and a forwardly directed open air inlet end; an elongated distributing header extending in a lateral direction with respect to the side walls of the mixing chamber, said distributing header having enclosing walls and closed ends and a plurality of spaced outlet ports in the walls, said distributing header being virtually as long as said airfoil; said distributing header being disposed rearwardly of the mixing chamber and in communication therewith; said mixing chamber including a restricted throat adapted to increase the velocity and decrease the pressure of air passing through said throat; rearwardly directed conduit means extending into and terminating in said throat for introducing treating agent into the air stream owing through the throat whereby air passing through said throat draws treating agent from said conduit; and means for attaching the distributing header to said airfoil in spaced relation thereto with at least some of the outlet ports directed toward such airfoil.

2. Apparatus of the character stated in claim 1 wherein the total area of the outlet ports exceeds the minimum cross-sectional area of the mixing chamber.

3. Apparatus of the character stated in claim 1 wherein the outlet ports of the distributor, in the region exposed to wash from the propeller, are of larger output capacity than other outlet ports.

4. Apparatus of the character stated in claim 1 including, adjustably positionable means for varying the spacing between the distribution header and the airfoil.

5. Apparatus of the character stated in claim 1 including, adjustably positionable louver means at the open inlet to said mixing chamber.

References Cited in the file of this patent
UNITED STATES PATENTS

| | | |
|---|---|---|
| 1,691,205 | Morse | Nov. 13, 1928 |
| 1,774,472 | Burnelli | Aug. 26, 1930 |
| 1,922,825 | Squires | Aug. 15, 1933 |
| 1,957,075 | Morgensen | May 1, 1934 |
| 2,473,212 | Monson | June 14, 1949 |
| 2,488,554 | Otterson | Nov. 22, 1949 |
| 2,493,017 | Nutter | Jan. 3, 1950 |
| 2,504,247 | Bowman | Apr. 18, 1950 |
| 2,591,157 | Hutchinson | Apr. 1, 1952 |
| 2,626,769 | Wadman | Jan. 27, 1953 |

FOREIGN PATENTS

| | | |
|---|---|---|
| 54,300 | Denmark | Feb. 7, 1938 |